US010235277B2

(12) United States Patent
Herzig et al.

(10) Patent No.: US 10,235,277 B2
(45) Date of Patent: *Mar. 19, 2019

(54) METHOD OF DETECTING FALSE TEST ALARMS USING TEST STEP FAILURE ANALYSIS

(71) Applicant: Microsoft Technology Licensing, LLC, Redmond, WA (US)

(72) Inventors: Kim Sebastian Herzig, Cambridge (GB); Nachiappan Nagappan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,636

(22) Filed: Jun. 16, 2017

(65) Prior Publication Data

US 2017/0286276 A1 Oct. 5, 2017

Related U.S. Application Data

(63) Continuation of application No. 14/845,891, filed on Sep. 4, 2015, now Pat. No. 9,710,364.

(51) Int. Cl.
*G06F 9/44* (2018.01)
*G06F 11/36* (2006.01)

(52) U.S. Cl.
CPC ...... *G06F 11/3672* (2013.01); *G06F 11/3692* (2013.01)

(58) Field of Classification Search
CPC .................................................. G06F 11/3672
(Continued)

(56) References Cited

U.S. PATENT DOCUMENTS 5,355,496 A 10/1994 Fant et al.
6,067,639 A * 5/2000 Rodrigues ........... G06F 11/3688
714/38.11
(Continued)

FOREIGN PATENT DOCUMENTS

CN 101247269 A 8/2008
CN 101562537 B 4/2011
(Continued)

OTHER PUBLICATIONS

Eickehnann et al, "An Evaluation of Software Test Environment Architectures", IEEE, pp. 353-364, 1996.*
(Continued)

*Primary Examiner* — Anil Khatri
(74) *Attorney, Agent, or Firm* — Workman Nydegger

(57) ABSTRACT

Identifying false test alarms to a developer. A code build is executed in a test system that includes computing functionality and computing infrastructure that is able to execute the build. Executing the code build includes running a plurality of system and integration tests on the code build. As a result of executing the code build, a system and integration test failure is identified. One or more characteristics of the system and integration test failure are identified. The characteristics of the system and integration test failure are compared to characteristics of a set of historical previous known false test alarms. False test alarms are failures caused by a factor other than a factor for which a test is being run. Based on the act of comparing, information is provided to a developer with respect to if the system and integration test failure is potentially a false test alarm.

20 Claims, 6 Drawing Sheets

(58) Field of Classification Search
USPC .................................. 717/123–129, 140–141
See application file for complete search history.

(56) References Cited

U.S. PATENT DOCUMENTS

| | | | |
|---|---|---|---|
| 6,138,112 A | 10/2000 | Slutz | |
| 6,701,514 B1 | 3/2004 | Haswell et al. | |
| 7,209,851 B2* | 4/2007 | Singh | G01R 31/3183 702/108 |
| 7,299,453 B2 | 11/2007 | Sluiman et al. | |
| 7,475,405 B2 | 1/2009 | Manganaris et al. | |
| 7,490,319 B2* | 2/2009 | Blackwell | G06F 11/3664 717/124 |
| 7,509,538 B2 | 5/2009 | Triou et al. | |
| 7,596,778 B2 | 9/2009 | Kolawa | |
| 7,685,271 B1 | 3/2010 | Schneider et al. | |
| 7,725,881 B2* | 5/2010 | Bhat | G06F 9/4488 717/124 |
| 7,797,687 B2* | 9/2010 | Tillmann | G06F 11/3684 714/38.14 |
| 7,886,357 B2 | 2/2011 | Rowland et al. | |
| 7,926,036 B2* | 4/2011 | Nagappan | G06F 11/3616 717/124 |
| 7,954,090 B1 | 5/2011 | Qureshi et al. | |
| 8,185,910 B2 | 5/2012 | Swildens | |
| 8,332,820 B2 | 12/2012 | Hummel, Jr. | |
| 8,375,370 B2* | 2/2013 | Chaar | G06Q 10/06 717/124 |
| 8,387,024 B2* | 2/2013 | Urra | G06F 11/3684 714/38.1 |
| 8,429,614 B2 | 4/2013 | Zhang et al. | |
| 8,429,618 B2 | 4/2013 | Hogan | |
| 8,490,064 B2 | 7/2013 | Shrivastava et al. | |
| 8,510,714 B2* | 8/2013 | King | G06F 11/368 702/119 |
| 8,595,703 B2 | 11/2013 | Van Gogh et al. | |
| 8,627,287 B2* | 1/2014 | Fanning | G06F 8/75 717/124 |
| 8,683,440 B2 | 3/2014 | Pasternak | |
| 8,726,225 B2* | 5/2014 | Shu | G06F 11/3676 717/100 |
| 8,739,130 B2 | 5/2014 | Saaroni et al. | |
| 8,752,001 B2 | 6/2014 | Sureka et al. | |
| 8,776,231 B2 | 7/2014 | Moskovitch et al. | |
| 8,793,659 B2* | 7/2014 | Muller | G06F 11/3672 714/724 |
| 8,869,116 B2 | 10/2014 | Fliek et al. | |
| 8,881,105 B2* | 11/2014 | Quilter, Jr. | G06F 11/3672 714/38.1 |
| 8,893,087 B2 | 11/2014 | Maddela | |
| 8,959,485 B2* | 2/2015 | Kvartskhava | G06F 21/53 717/124 |
| 8,972,949 B2 | 3/2015 | Ghosh et al. | |
| 9,015,671 B2 | 4/2015 | Johnson | |
| 9,032,370 B2* | 5/2015 | Chakraborty | G06F 11/3672 714/809 |
| 2008/0165000 A1 | 7/2008 | Morin et al. | |
| 2015/0039543 A1 | 2/2015 | Athmanathan et al. | |

FOREIGN PATENT DOCUMENTS

| | | |
|---|---|---|
| CN | 101937447 B | 5/2012 |
| CN | 103107902 A | 5/2013 |

OTHER PUBLICATIONS

Gupta et al, "Locating Faulty Code Using Failure-Inducing Chops", ACM, pp. 263-272, 2005.*
Neto et al, "Improving Continuous Integration with Similarity-based Test Case Selection", ACM, pp. 39-45, 2018 (Year: 2018).*
Landhaußer et al, "Automated Test-Case Generation by Cloning", IEEE, pp. 83-88, 2012 (Year: 2012).*
Yamada et al, "Greedy Combinatorial Test Case Generation using Unsatisfiable Cores", ACM, pp. 614-624, 2016 (Year: 2016).*
Gulia et al, "Comparative Analysis of Traditional and Object-Oriented Software Testing", ACM, pp. 1-4, 2015 (Year: 2015).*
Willmor et al, "An Intensional Approach to the Specification of Test Cases for Database Applications", ACM, pp. 102-111, 2006 (Year: 2006).*
Meng, et al., "Adaptive False Alarm Filter Using Machine Learning in Intrusion Detection", In Proceedings of Proceedings of the Sixth International Conference on Intelligent Systems and Knowledge Engineering, Dec. 2011, 4 pages.
Shin, et al., "False Alarm Classification Model for Network-Based Intrusion Detection System" in IDEAL, 2004, pp. 259-265.
Bertolion, et al., "Deriving Test Plans from Architectural Descriptions" ICSE 2000, Limerick, Ireland, pp. 220-229.
Chang, et al., "A Test Function with Full Controllability over Overlapping (Extimation of Distribution Algorithms)" EDCCO'11 Jul. 12-16, 2011, Dublin, Ireland, pp. 61-62.
"Non-Final Office Action Issued in U.S. Appl. No. 14/845,891", dated Nov. 21, 2016, 13 Pages.
"Notice of Allowance Issued in U.S. Appl. No. 14/845,891", dated Mar. 28, 2017, 13 Pages.
Curley, et al., "Recovering from Distributable Thread Failures in Distributed Real-Time Java", In Journal of the Transactions on Embedded Computing Systems, vol. 10, Issue 1, Article 8, Aug. 2010, 37 Pages.
Gupta, et al., "Software Failure Analysis in Requirement Phase", In Proceedings of the 5th India Software Engineering Conference, Feb. 22, 2012, pp. 101-104.
Lee, et al., "Software Reliability Prediction for Open Source Software Adoption Systems Based on Early Lifecycle Measurements", In IEEE 35th Annual Computer Software and Applications Conference, Jul. 18, 2011, pp. 366-371.
Liang, et al., "Regression Analysis Method for Software Reliability Growth Test Data", In IEEE Second World Congress on Software Engineering, Dec. 19, 2010, pp. 245-248.
Memon, Atif M., "Automatically Repairing Event Sequence-based GUI Test Suites for Regression Testing", In Proceedings of the ACM Transactions on Software Engineering and Methodology, vol. 18, Issue 2, Oct. 14, 2008, 36 Pages.
Wu, et al., "Quantitative Analysis of Faults and Failures with Multiple Releases of Soft PM", In Proceedings of the Second ACM-IEEE International Symposium on Empirical Software Engineering and Measurement, Oct. 9, 2008, pp. 198-205.
Wuttke, et al., "An Approach to Detecting Failures Automatically", In Proceedings of the Fourth International Workshop on Software Quality Assurance: In Conjunction with the 6th ESEC/FSE Joint Meeting, Sep. 3, 2007, pp. 17-24.
U.S. Appl. No. 14/699,387, Herzig, et al., "Method of Optimizing Testing Process using Prior Test Execution History", filed Apr. 29, 2015.
Herzig, et al., "Empirically Detecting False Test Alarms Using Association Rules", In Proceedings of 37th International Conference on Software Engineering, May 2015, 10 pages.
Czerwonka, et al., "CODEMINE: Building a Software Development Data Analytics Platform at Microsoft", In Journal of IEEE Software, vol. 30, No. 4, Jul. 1, 2013, pp. 64-71.
Herzig, et al., "Mining Cause-Effect-Chains from Version Histories", In Proceedings of IEEE 22nd International Symposium on Software Reliability Engineering, Nov. 29, 2011, pp. 60-69.
Herzig, Kim Sebastian, "Capturing the Long-Term Impact of Changes", In Proceedings of the 32nd ACM/IEEE International Conference on Software Engineering, vol. 2, May 2, 2010, pp. 393-396.
Mende, et al., "Effort-Aware Defect Prediction Models", In Proceedings of 14th European Conference on Software Maintenance and Reengineering, Mar. 15, 2010, 10 pages.
Nagappan, et al., "The Influence of Organizational Structure on Software Quality: An Empirical Case Study", In Proceedings of 30th International Conference on Software Engineering, May 10, 2008, pp. 521-530.
McIntosh, et al., "The Impact of Code Review Coverage and Code Review Participation on Software Quality: A Case Study of the Qt,

(56) References Cited

OTHER PUBLICATIONS

VTK, and ITK Projects", In Proceedings of 11th Working Conference on Mining Software Repositories, May 31, 2014, pp. 192-201.

Rothermel, et al., "Test Case Prioritization: An Empirical Study", In Proceedings of IEEE International Conference on Software Maintenance, Sep. 1999, pp. 1-10.

Kim, et. al., "A History-Based Test Prioritization Technique for Regression Testing in Resource Constrained Environments", In Proceedings of the 24th International Conference on Software Engineering, May 9, 2002, pp. 119-129.

Fujiwara, et al., "Test Selection based on Finite State Models", In IEEE Transactions on Software Engineering, vol. 17, Issue 6, Jun. 1991, pp. 591-603.

Rothermel, et al., "A Safe, Efficient Regression Test Selection Technique", In Journal ACM Transaction on Software Engineering Methodology vol. 6, Issue 2, Apr. 1997, 35 pages.

Fraser, et al., "EvoSuite: Automatic Test Suite Generation for Object-Oriented Software", In Proceedings of the 19th ACM SIGSOFT Symposium and the 13th European conference on Foundations of Software Engineering, Sep. 5, 2011, pp. 416-419.

Dallmeier, et al., "Generating Test Cases for Specification Mining", In Proceedings of the 19th International Symposium on Software Testing and Analysis, Jul. 12, 2010, pp. 85-95.

Zeltyn, et al., "Improving Efficiency in Software Maintenance", In Proceedings of the 8th Working Conference on Mining Software Repositories, May 21, 2011, pp. 215-218.

Herzig, et al., "The Impact of Test Ownership and Team Structure on the Reliability and Effectiveness of Quality Test Runs", In Proceedings of the 8th ACM/IEEE International Symposium on Empirical Software Engineering and Measurement, Sep. 18, 2014, 10 pages.

Hao, et al., "Is This a Bug or an Obsolete Test?", In Proceedings of the 27th European Conference on Object-Oriented Programming, Jul. 1, 2013, 25 pages.

Perscheid, et al., "Test Quality Feedback Improving Effectivity and Efficiency of Unit Testing", In Proceedings of 10th International Conference on Creating, Connecting and Collaborating through Computing, Jan. 18, 2012, pp. 60-67.

Guo, et al., "Characterizing and predicting which bugs get fixed: an empirical study of Microsoft Windows", In Proceedings of the 32nd ACM/IEEE International Conference on Software Engineering—vol. 1, May 1, 2010, pp. 495-504.

Bettneburg, et al., "What makes a good bug report?", In Proceedings of the 16th ACM SIGSOFT International Symposium on Foundations of software engineering, Nov. 9, 2008, pp. 308-318.

Zanetti, et al., "Categorizing Bugs with Social Networks: A Case Study on Four Open Source Software Communities", In Proceedings of the International Conference on Software Engineering, May 18, 2013, pp. 1032-1041.

Antoniol, et al., "Is It a Bug or an Enhancement?: A Text-based Approach to Classify Change Requests", In Proceedings of the conference of the center for advanced studies on collaborative research: meeting of minds, Oct. 27, 2008, 15 pages.

Sherwood, et al., "Automatically characterizing large scale program behavior", In Proceedings of the 10th international conference on Architectural support for programming languages and operating systems, Oct. 5, 2002, pp. 45-57.

Bowring, et al., "Active Learning for Automatic Classification of Software Behavior", In Proceedings of the ACM SIGSOFT international symposium on Software testing and analysis, Jul. 11, 2004, pp. 195-205.

Hildebrandt, et al., "Simplifying Failure-inducing Input", In Proceedings of the ACM SIGSOFT international symposium on Software testing and analysis, Aug. 1, 2000, pp. 135-145.

Jones, et al., "Empirical evaluation of the tarantula automatic fault-localization technique", In Proceedings of the 20th IEEE/ACM international Conference on Automated software engineering, Nov. 7, 2005, pp. 273-282.

Liu, et al., "Failure Proximity: A Fault Localization-based Approach", In Proceedings of the 14th ACM SIGSOFT international symposium on Foundations of software engineering, Nov. 5, 2006, pp. 46-56.

Zhou, et al., "Where Should the Bugs Be Fixed?—More Accurate Information Retrieval-based Bug Localization Based on Bug Reports", In Proceedings of the 34th International Conference on Software Engineering, Jun. 2, 2012, pp. 14-24.

Pinto, et al., "Understanding Myths and Realities of Test-suite Evolution", In Proceedings of the ACM SIGSOFT 20th International Symposium on the Foundations of Software Engineering, Nov. 11, 2012, 11 pages.

Galli, et al., "Ordering Broken Unit Tests for Focused Debugging", In Proceedings of the 20th IEEE International Conference on Software Maintenance, Sep. 11, 2004, 10 pages.

Daniel, et al., "ReAssert: Suggesting Repairs for Broken Unit Tests", In Proceedings of 24th IEEE/ACM International Conference on Automated Software Engineering, Nov. 16, 2009, 12 pages.

Daniel, et al., "On Test Repair Using Symbolic Execution", In Proceedings of the 19th International Symposium on Software Testing and Analysis, Jul. 12, 2010, 11 pages.

Yang, et al., "Specification-Based Test Repair Using a Lightweight Formal Method", In Proceedings of 18th International Symposium, pp. 455-470.

Alshahwan, et al., "Automated Session Data Repair for Web Application Regression Testing", In Proceedings of 1st International Conference on Software Testing, Verification, and Validation, Apr. 9, 2008, pp. 298-307.

Memon, ATIF M., "Automatically Repairing Event Sequence-based GUI Test Suites for Regression Testing", In Journal of ACM Transactions on Software Engineering and Methodology, vol. 18, No. 2, Oct. 2008, 36 pages.

Dickinson, et al., "Pursuing Failure: The Distribution of Program Failures in a Profile Space", In Proceedings of the 8th European Software Engineering Conference Held Jointly with 9th ACM SIGSOFT International Symposium on Foundations of Software Engineering, Sep. 10, 2001, pp. 246-255.

Podgurski, et al., "Automated Support for Classifying Software Failure Reports", In Proceedings of the 25th International Conference on Software Engineering, May 3, 2003, pp. 465-475.

Digiuseppe, et al., "Concept-based Failure Clustering", In Proceedings of the ACM SIGSOFT 20th International Symposium on the Foundations of Software Engineering, Nov. 11, 2012, 4 pages.

Francis, et al., "Tree-Based Methods for Classifying Software Failures", In Proceedings of the 15th International Symposium on Software Reliability Engineering, Nov. 2, 2004, 12 pages.

Bird, et al., "Assessing the Value of Branches with What-if Analysis", In Proceedings of the ACM SIGSOFT 20th International Symposium on the Foundations of Software Engineering, Nov. 11, 2012, pp. 1-11.

Murphy, et al., "Branching Taxonomy", In Technical Report, Feb. 26, 2014, pp. 1-17.

Agrawal, et al., "Mining Association Rules between Sets of Items in Large Databases", In Proceedings of the ACM SIGMOD international conference on Management of data, Jun. 1, 1993, pp. 207-216.

Hahsler, et al., "The Arules R-Package Ecosystem: Analyzing Interesting Patterns from Large Transaction Data Sets", In Journal of Machine Learning Research, vol. 12, Jun. 2011, 5 pages.

"R: A Language and Environment for Statistical Computing", In Publication of R Foundation for Statistical Computing, Jul. 3, 2015, 2 pages.

Zimmermann, et al., "eROSE: Guiding Programmers in Eclipse", In Proceedings of 20th Annual ACM SIGPLAN Conference on Object-oriented Programming, Oct. 16, 2005, pp. 186-187.

Treinen, et al., "A Framework for the Application of Association Rule Mining in Large Intrusion Detection Infrastructures", In Proceedings of the 9th international conference on Recent Advances in Intrusion Detection, Sep. 20, 2006, 18 pages.

Yu, et al., "An Adaptive Automatically Tuning Intrusion Detection System", In Journal of ACM Transactions on Autonomous and Adaptive Systems, vol. 3 Issue 3, Aug. 2008, 10 pages.

(56) References Cited

OTHER PUBLICATIONS

Markam, et al., "A General Study of Associations rule mining in Intrusion Detection System", In International Journal of Emerging Technology and Advanced Engineering, vol. 2, Issue 1, Jan. 2012, pp. 347-356.

Kulhare, et al., "Survey Paper on Intrusion Detection Techniques", In Proceedings of International Journal of Recent Scientific Research vol. 4, Issue, 9, Sep. 2013, pp. 1314-1319.

Cui, et al., "Multi-State Adaptive BIT False Alarm Reduction under Degradation Process", In IEEE Transactions on Instrumentation and Measurement, vol. 64, Issue 3, Sep. 4, 2014, pp. 671-682.

* cited by examiner

METHOD OF DETECTING FALSE TEST ALARMS USING TEST STEP FAILURE ANALYSIS

CROSS-REFERENCE TO RELATED APPLICATIONS

This application is a Continuation of U.S. patent application Ser. No. 14/845,891 filed on Sep. 4, 2015, entitled "Method of Detecting False Test Alarms Using Test Step Failure Analysis," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Every day engineers change computer software systems applying code changes to add new features, improve the product or to fix known issues. However, code changes increase the risk of introducing new issues or incompatibilities. To ensure that code changes do not lower product quality and that code changes are functionally correct and comply with certain predetermined constraints, developers typically test their code changes before merging them into a current code base. Testing all code changes applied to a code base for large software systems may be in itself a time-consuming task. While test cases on unit level might run fast, higher-level tests, such as system and integration tests, usually take more time to complete. Thus, the more changes are applied the more tests need to be executed and the more time each code change spends in verification before being integrated into the final product.

System and integration testing includes tests that typically check for constraints such as compatibility, performance, privacy, etc. In theory, test cases either pass or fail and if they fail, they hint to code defects, stress defects, load testing failures, application compatibility failures, or any other factor for which a test is being run. In practice, running system and integrations tests for systems requires complex test setups and infrastructures, which come with their own issues. Thus, system and integration tests may also fail due to test and infrastructure issues. For example, broken hardware may prevent a test from retrieving a remote file. Such test failures are false test alarms. As any test failure, false test alarms are reported to the engineers requiring manual investigation lowering development speed. However, false test alarms provide no insights into product quality but rather harm the development process. Therefore, it is desirable to minimize or eliminate false test alarms, or at least prevent them from disrupting the development process. At the same time, test failures due to code defects should, to a large extent, remain enabled and should not be ignored as these test failures may prevent code defects in code to be shipped to the customer.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a system for identifying potential false test alarms to a developer for a code base under test. The system includes a test system that includes computing functionality and computing infrastructure that is able to execute a code build, including running a plurality of system and integration tests on the code build to identify system and integration test failures and to identify one or more characteristics of the system and integration test failures. The system further includes a data store. The data store includes a set of association rules used for identifying potential false test alarms. False test alarms are test failures caused by a factor other than a factor for which a test is being run. The system further includes a comparator coupled to the test system and the data store. The comparator is configured to receive identification of characteristics of system and integration test failures from the test system and to compare the system and integration test failure characteristics to the association rules in the data store to identify potential false test alarms. The comparator is further configured to identify potential false test alarms to a user.

Another embodiment illustrated herein includes a method that may be practiced in a computer code testing environment. The method includes acts for identifying potential false test alarms to a developer for a code base under test. The method includes executing a code build in a test system that includes computing functionality and computing infrastructure that is able to execute the build. Executing the code build in the test system includes running a plurality of system and integration tests. As a result of executing the code build, the method further includes identifying a system and integration test failure. The method further includes identifying one or more characteristics of the system and integration test failure. The method further includes comparing the characteristics of the system and integration test failure to characteristics of a set of historical previous known false test alarms. Based on the act of comparing, the method further includes providing information to a developer with respect to if the system and integration test failure is potentially a false test alarm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with addi tional specificity and detail through the use of the accompanying drawings in which.

DETAILED DESCRIPTION

Optimizing test processes is likely to positively affect speed and productivity of overall software development processes. Embodiments described herein illustrate a precise false test alarm classification system, which identifies false test alarms automatically. It may be important to identify false test alarms quickly with little or no delay, so as to not block development of code branches for long periods of time. The system analyzes reported and manually classified false test alarms. Using association rule mining, embodiments detect frequently occurring patterns between failures of individual test steps of a test case that are unique for false test alarms and create association rules with each rule identifying characteristics of a test case that results in a false test alarm. These association rules are then used to automatically classify newly reported test failures as false test alarms.

Some embodiments use association rule mining to analyze large numbers (e.g., tens of millions) of individual test steps to detect patterns between these test steps that are unique to (or very highly indicative of) false test alarms. Using these test behavior patterns, a fully automatic and continuously learning system can be implemented to pre-classify test case failures as false test alarms.

A system and integration test case checks for one or multiple system constraints such as compatibility, performance, privacy, functional correctness etc. Where system constraints exist on products, additional test infrastructure is required to ensure all code meets those constraints. Since product constraints are system properties, they often need to be verified at system level. For example, some software has certain backward compatibility requirements, both in terms of hardware and in terms of supported applications. To verify these constraints may require the emulation of many (e.g., millions of) different configurations and execution setups.

Figure 1:
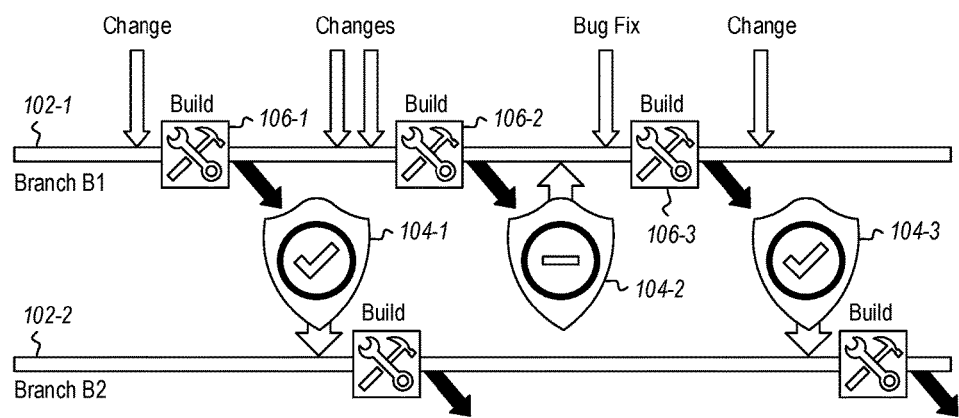
FIG. 1 illustrates a code integration process.

Referring now to FIG. 1, the development process to develop and maintain large software systems typically involves multiple code branches—a forked copy of the code base that allows parallel modifications without interference. FIG. 1 illustrates two code branches 102-1 and 102-2. Typically, code changes are applied in development branches and once ready, integrated into the trunk branch using integration branches. Each merge between branches (e.g., FIG. 1 illustrates branch 102-1 merging into branch 102-2 at various points) is guarded by system and integration test cases (e.g., test cases 104-1 for a first integration request, 104-2 for a second integration request, 104-3 for a third integration request, etc.) ensuring basic functionality and constraints such as compatibility and performance compliance. In the example illustrated in FIG. 1, passing test case instances 104-1 and 104-3 allow merging branch 102-1 into branch 102-2 after builds 106-1 and 106-3 while failing test case instance 104-2 prevents merging branch 102-1 into branch 102-2 after build 106-2, thus returning the state of the code back to branch 102-1. Thus, each code change has to pass multiple layers of system and integration tests while code changes from different development branches are merged together. Once a code change reaches the trunk branch it is considered as part of the next release.

Figure 2:
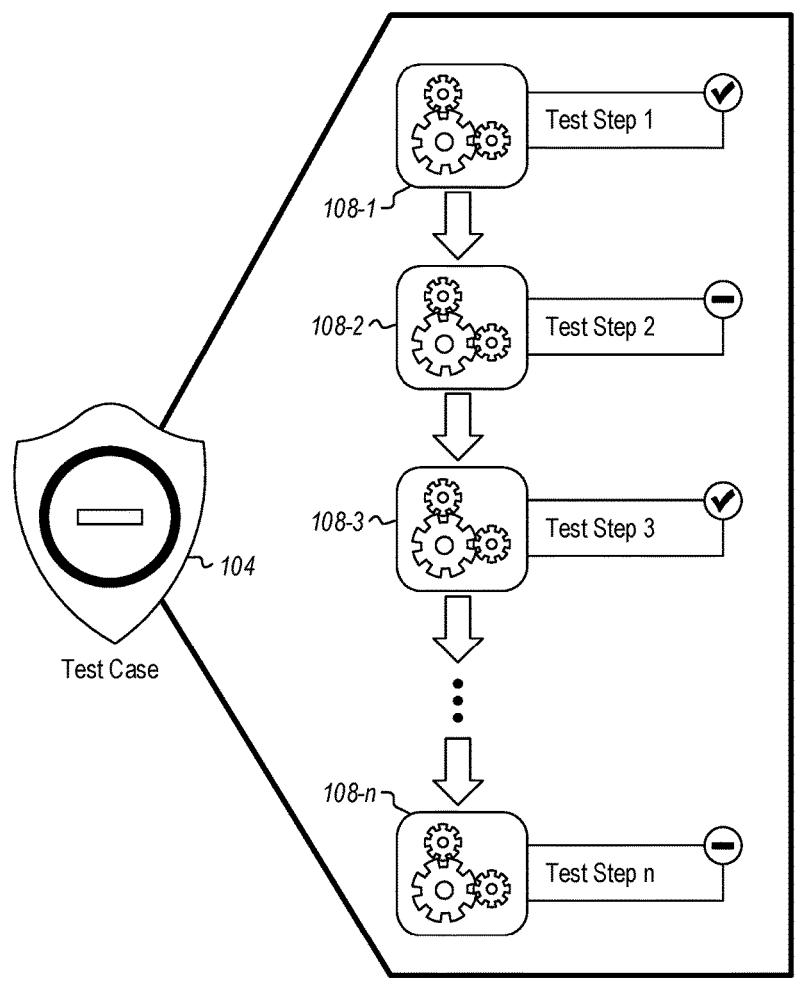
FIG. 2 illustrates a test case and associated test steps.

Referring now to FIG. 2, each system and integration test case 104 can be considered a test scenario executing a sequence of test steps 108-1, 108-2, 108-3 through 108-*n* to complete the test case 104. To successfully complete the test case 104, all test steps 108-1 through 108-*n* must pass. As a consequence, any failing test step (e.g., test steps 108-2 and 108-*n*) causes the corresponding test case 104 to report a test failure.

Figure 3:
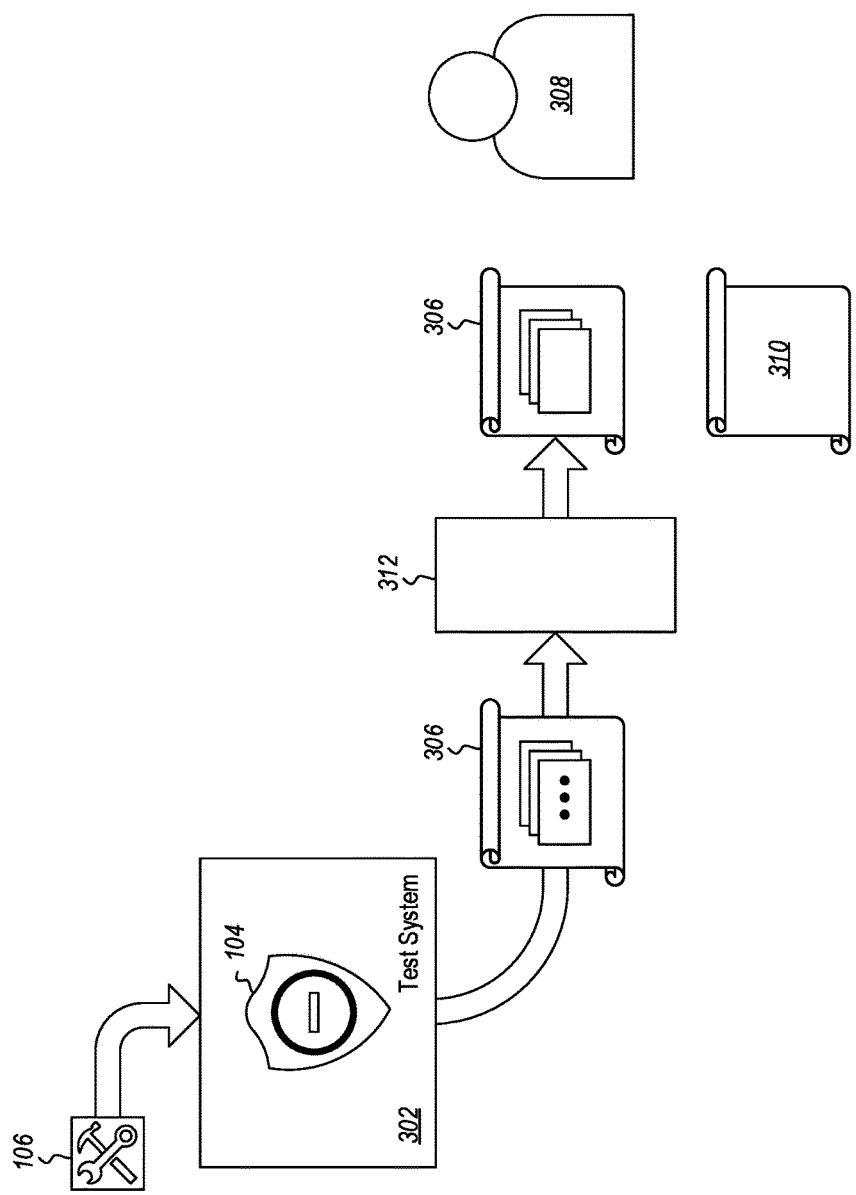
FIG. 3 illustrates a test system and a test failure evaluation tool for identifying false test alarms.

A failing test case causes a development process disruption. Scheduled code integration requests are canceled and the corresponding code branch on which the test failure occurred is excluded from code integration processes until the issue is resolved. Close to product release deadlines, this can delay the overall product release itself. Each failed test case requires manual inspection and resolution to include the branch code, and its code branch sub-tree, into the code integration process again. As a consequence, each system and integration test failure not only affects the engineers that submitted code changes to the branch before the test failure, but all engineers that will have to merge their code changes through this code branch to integrate into the main trunk branch. Note that a failing test step may not cause the test case to terminate immediately. Thus, each executed test case may report more than one test step failure each of which may relate to a code defect stress defects, load testing failures, application compatibility failures, or any other factor for which a test is being run or a false test alarm. Test case failures reported to engineers contain a list of test steps that failed to help the engineer to investigate the failure cause and to resolve the underlying issue. For example, FIG. 3 illustrates that a build 106 is provided to a test system 302. The test system includes computing functionality and computing infrastructure that is able to execute the build 106 and to evaluate the build against various test cases. FIG. 3 illustrates a single test case 104 being evaluated, but it should be appreciated that typically multiple different test cases will be evaluated for a build 106. If the build 106 fails the test case 104, the test system can generate a list 306 that identifies the test steps for a given test cases 104 that failed (or using negative logic, the test steps that did not fail). This list 306 can be provided to a user 308 for investigation to determine the reason for the test case 104 failure.

Test results presented to users are classified as passing or failing. However, it can be useful to further distinguish whether a test failure is caused by one or more code defects stress defects, load testing failures, application compatibility failures, or any other factor for which a test is being run or whether the test failures can be considered false test alarms. A test failure that is due to any other reason than a code defect stress defects, load testing failures, application compatibility failures, or any other factor for which a test is being run is regarded as a false test alarm. In most cases, such false test alarms are caused by test and infrastructure issues. For example, a false test alarm may occur when a test case is required to fetch an input source from a remote server that cannot be reached at the time of the test execution. This is an example of an infrastructure issue. False test alarms are a common issue during system and integration tests.

False test alarms are expensive and harm the verification and development process without providing any benefit.

Like other test failures, false test alarms, if not identified as false test alarms, require manual inspection, which is typically expensive. However, unlike test failures due to code defects or any other factor for which a test is being run, investigating false test alarms is a waste of time and resources. The result of the investigation will be that the test failure was due to test and/or infrastructure issues, but allows no conclusion about the actual quality of the code under tests. The test suite execution must be repeated, once the test infrastructure issue is resolved. Like for any other test failure, the code branch is banned from code integrations until the tests pass. This is likely to affect other engineers on the same branch as they are also banned from integrating changes into the main trunk branch. Thus, false test alarms not only waste the time of engineers inspecting the test failure but also slows down productivity and code velocity of entire development teams.

Embodiments illustrated herein can investigate the behavior of individual test steps 108-1 through 108-n in concert with other test steps to judge the outcome of an overall test case 104. False test alarms show specific patterns or combinations of test step failures that rarely occur during normal test executions including test failures due to code defects or any other factor for which a test is being run. If a test case failure can be identified as a likely false test alarm, that test case failure can be identified to the user 308 in a false test alarm notification 310 indicating to the user 308 that a test case failure is likely (or positively) a false test alarm.

In particular, embodiments may include a test failure evaluation tool 312 that is able to apply false test alarm detection association rules to characteristics of a failed test case 104 to identify that a failed test case 104 is likely a false test alarm. In particular, some embodiments use previous test case failures that were previously identified as false test alarms to create association rules.

Thus, for example, it may have been previously determined that test case 104 had a number of failures and that when those failure had failures of test steps 108-1 and 108-n, then those failures of the test case 104 were false test alarms. This can be used to create an association rule for use by the failure evaluation tool 312. The failure evaluation tool 312 compares new test case failures to association rules to identify false test alarms. Any identified false test alarms (such as alarms caused by a failure of test case 104 that includes failures of test steps 108-1 and 108-n) can be identified to a user 308 in a false test alarm notification 310. In this way, the user can choose to not investigate the failure of the test case 104.

In some embodiments, when it is not 100% certain that a test failure results in a false test alarm (i.e., a false positive is possible where code defects or any other factor for which a test is being run may actually exist even though evaluation indicates a false test alarm) the failure evaluation tool 312 can provide an indication in the false test alarm notification of a probability that the failure is due to a false test alarm. This allows the user 308 to better able determine if they wish to investigate the failure of the test case 104 or not, or to prioritize investigation of the failure of the test case 104.

In other embodiments, the failure evaluation tool 312 may include a filter that prevents failure of the test case 104 from being reported to the user 308 at all when a false test alarm is detected.

In still other embodiments, the failure evaluation tool 312 may have enhanced information that can identify possible test or infrastructure issues that resulted in the failure of the test case 104. This information can be provided to the user 308. In some embodiments the information may be annotated to association rules in data store storing association rules. This information may be provided by manual annotating of the data store, automatically be examination of bug reports and remedial action reports, or in other appropriate ways.

Figure 4:
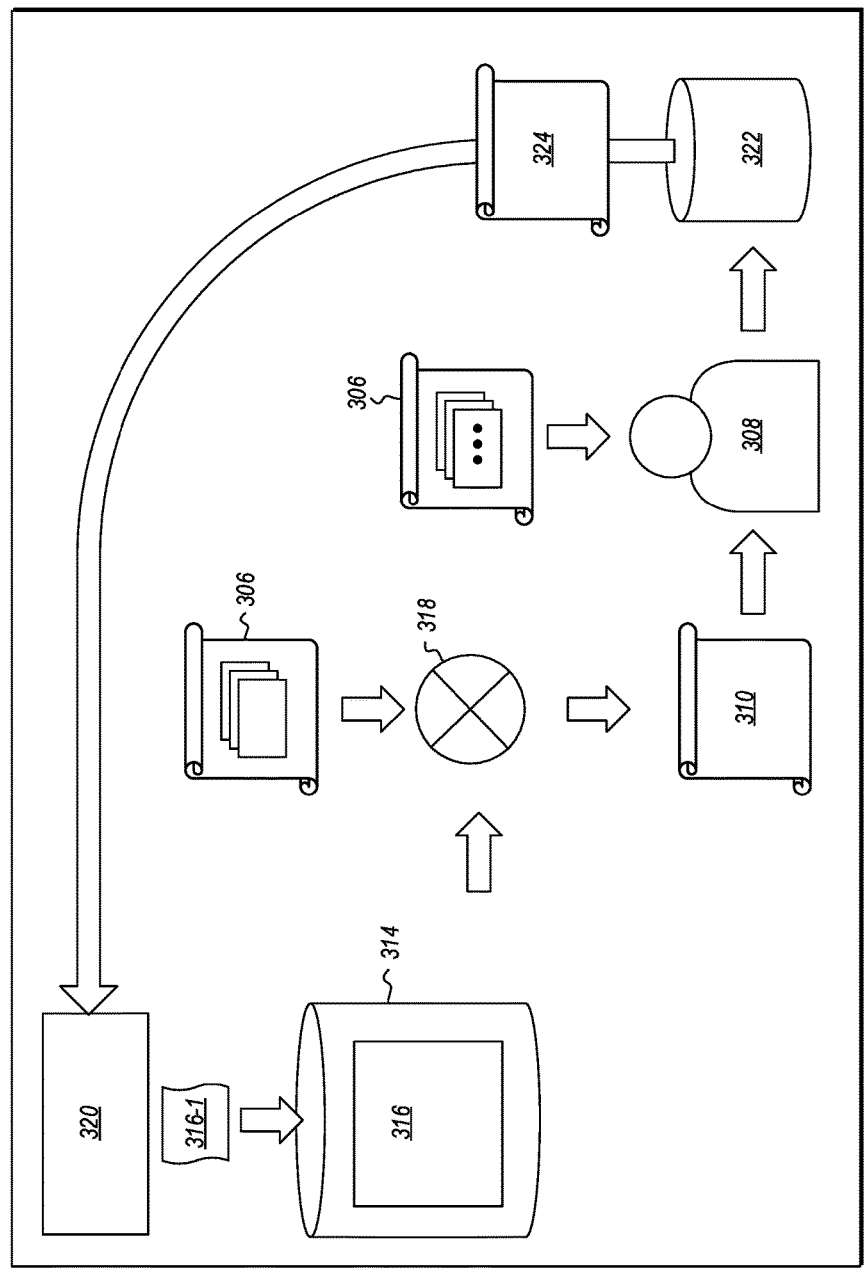
FIG. 4 illustrates additional details of the test failure evaluation tool.

FIG. 4 illustrates an example with additional details of the failure evaluation tool 312. In particular, the failure evaluation tool 312 includes a data store 314. The data store 314 includes a set 316 of association rules, where the association rules identify characteristics of failed test cases that indicate that the failed test cases are false test alarms. The failure evaluation tool further includes a comparator 318 that receives as input the list 306 of test steps for a failed test case 104 and compares the list 306 to the association rules in the set 316 of association rules. If the characteristics of the test case 104, in this case as determined by the information in the list 306, match one or more association rules, then a false test alarm notification 310 can be generated by the comparator 318.

To create the set 316 of association rules in the first instance, a set of previous test failures can be investigated and a determination of whether or not those failures were false test alarms can be made. Characteristics of any false test alarms can be identified, and the set 316 of association rules can be based on this identification For each previous failing test case, some embodiments collect the following properties of all executed (failing and passing) test steps executed:

The unique identifier of the test case execution. Each test case execution is assigned a unique identifier that can be used to reference a specific executed instance of a test case.

The unique identifier of the test case, typically the test case name. However, this identifier does not specify the exact execution (see test case execution identifier above). A test is typically associated with many executions.

The identifier of the executed test step. Each test case is a sequence of test steps. Test steps themselves have unique names within a test case. In some embodiments, the full-qualified test step name is a combination of test case name and test step name. This allows embodiments to uniquely refer to an individual test step and is unique among all test steps names.

A simple binary field indicating whether the test step has passed or failed. This binary field will typically not contain an indication on whether the test case step failed due to a code defect or any other factor for which a test is being run or a test or infrastructure issue.

At this point in time, embodiments make no assumption on test failures or their possible causes. In particular, embodiments do not make any judgment on whether the test case or the individual test step failed due to code defects or any other factor for which a test is being run and/or test and/or infrastructure issues.

To identify false test alarms for learning purposes, embodiments trace development activities that occurred after a test failure. In some embodiments, this can be done by mining software repositories as done by the CODEMINE infrastructure available from Microsoft Corporation of Redmond, Wash. Test failures referencing bug reports that were fixed by applying code changes are considered test failures due to code defects or any other factor for which a test is being run. Test failures that did not lead to a bug report or that were assigned to bug reports, which never got fixed, are considered false test alarms. One exception to this is test failures that were not investigated at all. Embodiments can ignore these instances and remove them from the list of observed test failures.

Figure 5:
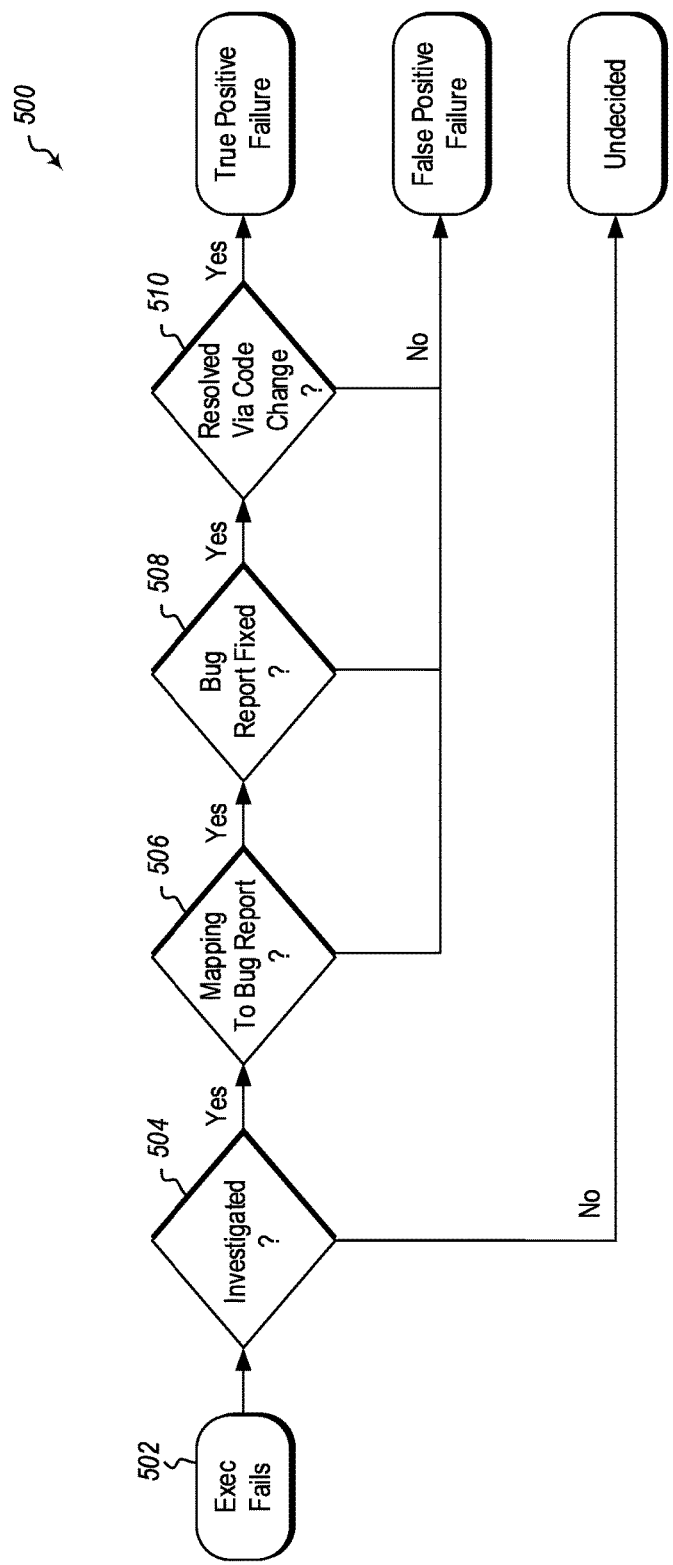
FIG. 5 illustrates a flow used to classify test failures when training the test failure evaluation tool.

A flow 500 is illustrated in FIG. 5 that illustrates this evaluation. At 502 it is determined that a code execution has failed a test case. At 504, a determination is made as to whether or not the failure was investigated. If not, there is no information as to whether or not the failure can be used to identify false test alarms. At 506, a determination is made as to whether or not the failure was mapped to a bug report. If not, embodiments assume that this is because it was determined by later evaluation to be due to a false test alarm. If so, as illustrated at 508, a determination is made as to whether or not there is an indication that the bug was fixed. Again, if not fixed, this can be used to assume that it was not fixed because there was no code bug and instead a false test alarm was present. If so, as illustrated at 510, a determination is made if the failure was resolved by a code change. If not, then again it is assumed that this is because the failure was a false test alarm. If so, then the failure is a true positive code failure.

To discover patterns among test step behavior unique to test failures that were identified as false test alarms, some embodiments use association rule learning to produce rules of the form: $\{a_1, \ldots, a_n\} \Rightarrow \{c\}$ where left hand side of the implication (antecedent) represents one or multiple conditions that need to be satisfied to imply the right hand side (consequent). In particular, the set of antecedents $a_1, \ldots, a_n$ will indicate which combination of test step results is expected to indicate the type of test failure reported by the test case. As an example, consider the following rule:

$$\{TestStep_X=1, TestStep_Y=0, TestStep_Z=1\} \Rightarrow FTA.$$

This association rule suggests that a test case execution in which test steps X and Z fail but test step Y passes should be considered a false test alarm. Typically, association rule learning returns more than a single association rule. Each rule can be treated as a separate set of conditions that if satisfied by a test case execution indicates how to interpret the corresponding test case result. Note that the antecedents of an association rules are not sufficient to let the consequence to become true. Association rules do not state implications but probabilistic relationships. As a consequence, association rules are associated with statistical measurements: support and confidence. Translated to the usage scenario, support is a value between zero and one and defined as the proportion of test case executions for which all antecedents were satisfied. A support value of 0.5 would mean that 50% of all observed test case executions satisfied all antecedents. In the example above this would mean that in 50% of all test case executions, test steps X and Z fail while test step Y passes. The confidence in a rule is defined as the relative number of observed test case executions for which all antecedents and the consequence were satisfied over the number of test case executions for which all antecedents were satisfied:

$$\text{confidence}(\{A \Rightarrow \{c\}\}) = \frac{\text{support}(A)}{\text{support}(A \cup \{c\})},$$

where A represents a set of antecedent such as $\{a_1, \ldots, a_n\}$. Confidence values range between zero and one. A confidence value of 0 indicates that in all cases for which the antecedents were satisfied the consequence would never be satisfied. A confidence value of 1 indicates that in all cases for which the antecedents were satisfied the consequence could always be satisfied as well. Confidence values between 0 and 1 indicate a percentage (e.g., 0.9 indicates 90%) of cases for which the antecedents were satisfied the consequence could be satisfied as well. Note that different association rules might contradict each other. Therefore, embodiments may remove contradicting rules from rule sets before using them. As a result, for a series of observed test case executions, embodiments extract a set of association rules expressing probabilistic relations between test step results and the overall test case failure categorization.

Each rule is associated with a support and confidence value that allows embodiments to filter rules based on their frequency (based on support) and accuracy (based on confidence). It may be desirable for confidence to be selected to be very high, and in some cases, approaching 1 so that false positives where actual code defects or any other factor for which a test is being run are identified as false test alarms are minimized. Similarly, the support value should be reasonable as well so that decisions are not being based on a few, or even a single previous test case failure. However, the support value can be decreased inversely with respect to the number of previously detected failures. In particular, a very large collection of failures may still have a significant number of occurrences of test failures with certain characteristics even though the actual support value indicates a low percent. Thus, embodiments may adjust the support value (and in some instances the confidence value) for association rules that are usable by the failure evaluation tool 312 depending on the amount of failure data available.

Embodiments may include a learning engine 320 that is configured to perform association rule learning on a given set of test case executions to add association rules (such as rule 316-1) to the set 316 of association rules. In some embodiments, the learning engine 320 may use the apriori algorithm described by M. Hahsler, S. Chelluboina, K. Hornik and C. Buchta, in "The Arules R-Package Ecosystem: Analyzing Interesting Patterns from Large Transaction Data Sets," J. Mach. Learn. Res., vol. 12, pp. 2021-2025, July 2011 in their rules package for the statistical framework R which is a software environment for statistical computing and graphics. For each given set of observations (transactions), the learning engine uses stringent selection criteria for association rules that are considered relevant. Association rules are associated with a predetermined minimum confidence value before being considered by the classification system. In some embodiments, this minimum confidence value is selected to be 0.8.

The minimum confidence value can be selectively chosen depending on a user's tolerance for false positives where code defects or any other factor for which a test is being run exist but are classified as false test alarms and/or a user's desire to implement aggressive false test alarm detection. For example, at the beginning of code development, a user may wish to eliminate as many false test alarm failures as possible for investigation and is willing to tolerate the system missing some failures that are due to actual code defect or any other factor for which a test is being run. In this case, a lower minimum confidence value could be selected. Alternatively, embodiments may wish to have very minimal false positives, and thus the minimum confidence value would be selected to be higher.

Additionally, embodiments may be configured to only consider rules that have a minimum support value. For example, some embodiments may only consider rules that appeared in at least 3% of all test case failures. This minimum support value may be derived by measuring the median number of occurrences per test case in the overall set of test failure observations and multiplying that number by ten.

For each set of observations, the set of association rules are split by the learning engine 320 into two subsets: one containing rules whose consequences indicate false test alarms (FP) and the other subset containing rules whose consequences indicate failures due to code defect or any other factor for which a test is being run (TP). To remove possible contradicting rules, the learning engine 320 only adds to the set 316 of association rules FP rules whose antecedents (left hand side) does not appear as antecedents in the set of TP rules.

Embodiments can use incremental learning to classify test case failures as false test alarms to create association rules based on previous test case execution observations. The learning engine starts 320 with an initial training set containing previous test case failures as they occurred during development (preserving temporal order). The idea is to build up a set of association rules as basis for any classification attempt. After this initial training phase, embodiments can continue to develop additional association rules as false test alarms are identified for the user. Embodiments proceed with the following steps:

Step 1: the test system 302 identifies a test case failure as it occurred during development and decomposes the failure into individual test step results (e.g., the list 306).

Step 2: the comparator 318 checks if the current set 316 of association rules contains any rule whose antecedent is satisfied by the test step results observed during test case execution. If any such rule exists, embodiments classify the test case failure as false test alarm and notify the user 308 (and/or filter the failure from the user, and/or any other appropriate action). If no such rule exists embodiments consider the test failure to be due to code defects or any other factor for which a test is being run and the user 308 can be notified that the test failure needs to be investigated.

Step 3: Embodiments compare the classification result with the actual ground truth by tracing development activities that occurred after a test failure. In particular, test failures referencing bug reports that were fixed by applying code changes are considered test failures due to code defects or any other factor for which a test is being run. Test failures that did not lead to a bug report or that were assigned to bug reports, which never got fixed, are considered false test alarms. This is illustrated in FIG. 3, where the learning engine 320 may be coupled to a development database 322 that stores and categorize test failure information and remedial measures (or lack thereof) (i.e., bug reports and fixes applied) to obtain additional information 324. Thus, can perform automated learning by accessing development databases.

Step 4: Depending on the result of the comparison in step 3 of the classification result identified in step 2 with the actual ground truth, the learning engine 320 marks the result either as true positive (the comparator 318 correctly predicted the test failure to be a false test alarm), false positive (the comparator 318 predicted the test failure to be a false test alarm but it was due to code defects or any other factor for which a test is being run), false negative (the comparator 318 failed to classify the test failure as false test alarm), or true negative (the comparator 318 correctly classified the test failure to be due to code defects or any other factor for which a test is being run).

Step 5: Embodiments use the ground truth as a new observation and use the updated pool of test case observations to update the set 316 of association rules. In particular new rules can be added to the set 316 of association rules and rules that incorrectly identified false test alarms can be removed. This allows for continuous updating of association rules over time. As will be discussed below, this is important for some bodies of code, while less important for other bodies of code.

Naturally, all test case executions that did not fail are treated as true negatives.

Depending on the code base, embodiments may vary the number of association rules required to achieve high precision. In particular, some embodiments may be able to implement a system where the number of association rules is rather constant—no new rules (or few rules) must be learned over time. However, other embodiments may implement a system where constant learning of new rules is required. In the first case, embodiments can extract the learned rules into a static, and faster, classification model. In the second case, embodiments need to keep learning new appearing rules. This is often dependent on the code base being tested.

For example, in some embodiments, the more code tested and/or test code changes made, the more dynamic the set of rules will have to be. Other factors to consider may include factors such as inclusion of legacy code, code churn, code complexity, code usage, prior quality of code, etc.

In some embodiments, the association rules have a relative short lifetime. This indicates a need for an automated classification system, as illustrated above, with a changing body of association rules. A high number of frequently changing patterns that can point out false tests alarms may be needed.

Preventing false test alarms to block the integration activity of a code branch or being raised to engineers could reduce unnecessary delays and thus improve development speed.

The classification system is an excellent tool to help engineers to prioritize test failures and to provide additional input for engineers to confirm the classification models decisions. Such a scenario has two important benefits. First, it would reduce the risk of code defects or any other factor for which a test is being run wrongly classified as false test alarms to a minimum. Instead of suppressing the test failure, the failure still reaches the engineer but warns her about the possibility of being a false test alarm. It would allow human supervision of the classification system and may include a feedback loop that allows engineers to override classification results which will then help to train the classification model. At the same time, such an interactive model might help engineers to prioritize their test failure inspection. Test failures classified as false test alarms could be seen as low severity failures. Additionally, false test alarms could be ranked by their corresponding support and confidence values such that engineers could prioritize which results classified as false test alarms they still wanted to manually review. Thus, for example, results classified as false test alarms with high support and/or confidence values may be ranked in a way that indicated less need for manual inspection, while lower support and/or confidence values might point to the need for more manual inspection.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
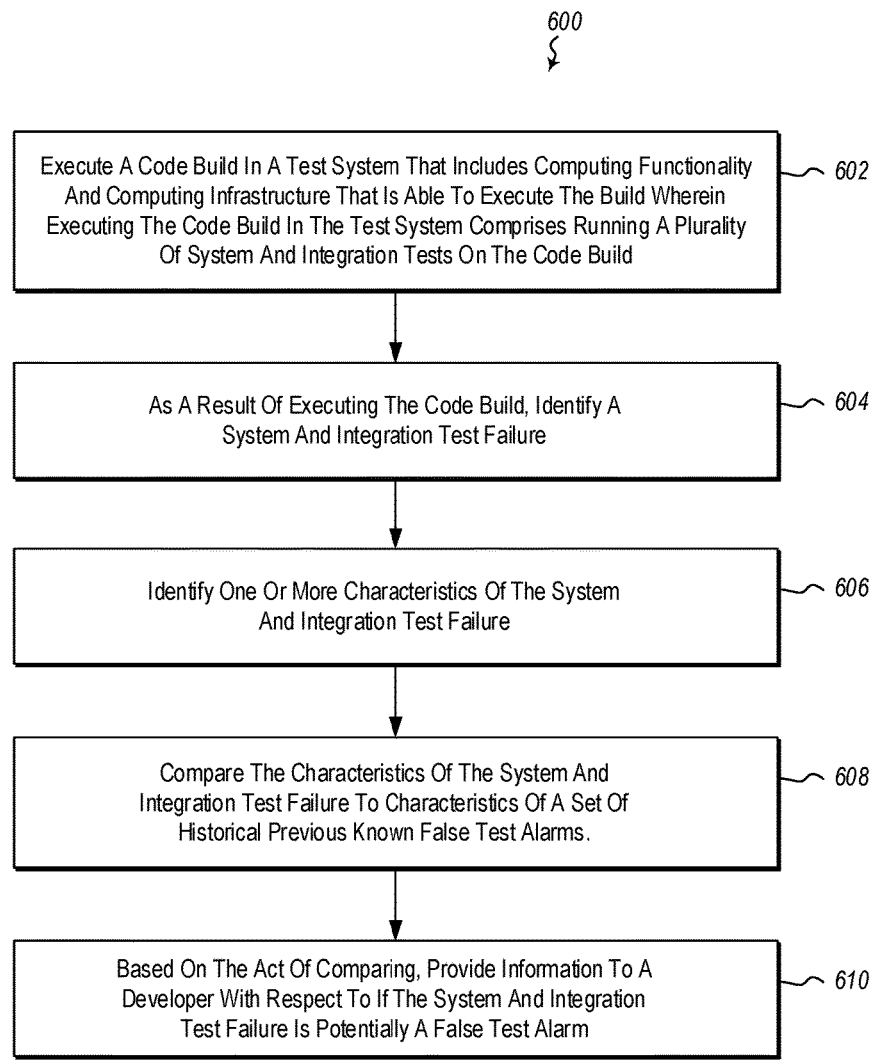
FIG. 6 illustrates a method of identifying potential false test alarms from historical development process data.

Referring now to FIG. 6, a method 600 is illustrated. The method 600 may be practiced in a computer code testing environment. The method includes acts for identifying potential false test alarms to a developer for a code build under test. The method 600 includes executing a code build in a test system that includes computing functionality and computing infrastructure that is able to execute the build wherein executing the code build in the test system comprises running a plurality of system and integration tests on the code build (act 602). For example, FIG. 3 illustrates a test system 302 that may be used to apply a test case 104 to a build 106.

The method further includes, as a result of executing the code build, identifying a system and integration test failure (act 604).

The method further includes, identifying one or more characteristics of the system and integration test failure (act 606). For example, FIG. 3 illustrates that a list 306 of failed test steps may be identified. The failed test steps may be the characteristics of the system and integration test failure.

The method further includes, comparing the characteristics of the system and integration test failure to characteristics of a set of historical previous known false test alarms (act 608). For example, the test failures may be due to a defective test setup, defective test infrastructure, etc. As illustrated in FIG. 4, the characteristics in the list 306 can be compared to a set of association rules 316 created by analyzing previous known false alarms. False alarms may occur, for example, due to infrastructure issues (such as network failures, hardware failures, external software failures, etc.), build failures, resource unavailability, missing external hardware or software, defective test cases, non-deterministic test cases, corrupt code binary, etc.

The method further includes, based on the act of comparing, providing information to a developer with respect to if the system and integration test failure is potentially a false test alarm (act 610). For example, FIG. 4 illustrates the false test alarm notification 310 being provided to the user 308.

The method 600 may be practiced where the compared characteristics are identified failing test steps in a test case such that comparing comprises attempting match failed test steps of a test case for the system and integration test failure to failed test steps of a test case for a historical previous known false test alarm.

The method 600 may be practiced where providing information comprises providing a statistical analysis. For example, a statistical Figure may be provided to the user giving an indication of the likelihood that the test failure is indeed a false test alarm.

The method 600 may be practiced where providing information comprises providing information based on a confidence and a support value.

The method 600 may further include providing a ranking of system and integration test failures based on the comparisons to the false test alarms. Thus, for example, different test failures may be identified to a user in a ranked list such that the user can readily identify which system and integration test failures are most likely false test alarms. The method 600 may be practiced where the ranking is based on the statistical significance of the comparison.

The method 600 may be practiced where providing information is only performed when a statistical threshold is met. Thus, if a statistical threshold is not met, the user may not be notified of a potential false test alarm.

The method 600 may further include receiving input regarding additional false test alarms, and as a result adding new false test alarms to the set of historical previous known false test alarms to allow new rules to be learned for evaluating subsequent system and integration test failures. Thus, for example, FIG. 4 illustrates a learning engine that is configured to create new association rules based on user input.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, a system for identifying potential false test alarms to a developer for a code base under test the system is implemented. The system includes a test system that includes computing functionality and computing infrastructure that is able to execute a code build, including running a plurality of system and integration tests on the code build to identify system and integration test failures and to identify one or more characteristics of the system and integration test failures. The test system includes a data store, wherein the data store comprises a set of association rules used for identifying potential false test alarms. The system includes a comparator coupled to the test system and the data store. The comparator is configured to receive identification of characteristics of system and integration test failures from the test system and to compare the system and integration test failure characteristics to the association rules in the data store to identify potential false test alarms. The comparator is configured to identify potential false test alarms to a user.

In one implementation of the just described system, the comparator is configured to compare identified failing test steps in a test case to the association rules. Alternatively or additionally, the comparator is configured to provide a statistical analysis of comparisons made by the comparator. Alternatively or additionally, the comparator may be used to provide information based on a confidence and support value. Alternatively or additionally, the comparator is configured to provide information based on a confidence and a support value. Alternatively or additionally, the comparator is configured to provide a ranking of test failures based on the comparisons to the false test alarms, in one example, the ranking is based on the statistical significance of the comparison. Alternatively or additionally, the comparator may be configured to identify false test alarms and test failures only after a certain statistical threshold has been met. Alternatively or additionally, the comparator is configured to identify potential false test alarms to a user only when a statistical threshold is met.

In another implementation of the system, the system comprises a learning engine coupled to the data store. The learning engine is configured to identify new association rules and to add the new association rules to the data store.

In one implementation, a method of identifying potential false test alarms to a developer for a code base under test is implemented. The method includes executing a code build in a test system that includes computing functionality and computing infrastructure that is able to execute the build. Executing the code build in the test system comprises running a plurality of system and integration tests on the code build. The method includes, as a result of executing the code build, identifying a system and integration test failure. The method includes identifying one or more characteristics of the system and integration test failure. The method includes comparing the characteristics of the system and integration test failure to characteristics of a set of historical previous known false test alarms. The method includes based on the act of comparing, providing information to a developer with respect to if the system and integration test failure is potentially a false test alarm.

In one implementation of the described method, the compared characteristics are identified failing test steps in a test case such that comparing comprises attempting match failed test steps of a test case for the system and integration test failure to failed test steps of a test case for a historical previous known false test alarm.

In another implementation of the described method, providing information comprises providing a statistical analysis.

In another implementation of the described method, providing information comprises providing information based on a confidence and a support value.

In another implementation of the described method, the method includes providing a ranking of test failures based on the comparisons to the false test alarms. In one such implementation, the ranking is based on the statistical significance of the comparison.

In another implementation of the described method, providing information is only performed when a statistical threshold is met.

In another implementation of the described method, the method further comprises receiving input regarding additional false test alarms, and as a result adding new false test alarms to the set of historical previous known false test alarms to allow new rules to be learned for evaluating subsequent system and integration test failures.

In one implementation, a system for identifying potential false test alarms to a developer for a code base under test is implemented. The system includes one or more processors and one or more computer-readable media. The one or more computer-readable media comprise computer-executable instructions that can be executed by at least one of the one or more processors to cause the following to be performed: executing a code build in a test system that includes computing functionality and computing infrastructure that is able to execute the build wherein executing the code build in the test system comprises running a plurality of system and integration tests on the code build; as a result of executing the code build, identifying a system and integration test failure; identifying one or more characteristics of the system and integration test failure; comparing the characteristics of the system and integration test failure to characteristics of a set of historical previous known false test alarms; and based on the act of comparing, providing information to a developer with respect to if the system and integration test failure is potentially a false test alarm.

In one implementation of the just described system, the compared characteristics are identified failing test steps in a test case such that comparing comprises attempting match failed test steps of a test case for the system and integration test failure to failed test steps of a test case for a historical previous known false test alarm.

In another implementation of the just described system, providing information comprises providing a statistical analysis.

In another implementation of the just described system, wherein providing information comprises providing information based on a confidence and a support value.

What is claimed is:

1. A system for identifying potential false test alarms to a developer for a code base under test the system comprising:
   a test system that includes computing functionality and computing infrastructure that is able to execute a code build, including running a plurality of system and integration tests on the code build to identify system and integration test failures and to identify one or more characteristics of the system and integration test failures;
   a data store, wherein the data store comprises a set of association rules used for identifying potential false test alarms, wherein each association rule in the association rules identifies characteristics of a test case, including system and integration test steps, that results in a false test alarm when system and integration test steps in test cases having the identified characteristics are executed by the test system; and
   a comparator coupled to the test system and the data store, wherein the comparator is configured to receive identification of characteristics of system and integration test failures from the test system and to compare the system and integration test failure characteristics to the association rules in the data store to identify potential false test alarms; and
   wherein the comparator is configured to generate a notification to a user identifying a test failure as a potential false test alarm when a potential false test alarm is identified.

2. The system of claim 1, wherein the comparator is configured to compare identified failing test steps in a test case to the association rules.

3. The system of claim 1, wherein the comparator is configured to provide a statistical analysis of comparisons made by the comparator.

4. The system of claim 1, wherein the comparator is configured to provide information based on a confidence and a support value.

5. The system of claim 1, wherein the comparator is configured to provide a ranking of test failures based on the comparisons to the false test alarms.

6. The system of claim 5, wherein the ranking is based on the statistical significance of the comparison.

7. The system of claim 1, wherein the comparator is configured to identify potential false test alarms to a user only when a statistical threshold is met.

8. The system of claim 1, further comprising a learning engine coupled to the data store, wherein the learning engine is configured to identify new association rules and to add the new association rules to the data store.

9. In a computer code testing environment, a method of identifying potential false test alarms to a developer for a code base under test the method comprising:
   executing a code build in a test system that includes computing functionality and computing infrastructure that is able to execute the build wherein executing the code build in the test system comprises running a test case, including a plurality of system and integration tests, including a plurality of test steps, on the code build;
   as a result of executing the code build and running the test case, identifying one or more system and integration test failures, including identifying failures of one or more test steps from the test case;
   identifying one or more characteristics of the system and integration test failures;
   comparing the characteristics of the system and integration test failures to characteristics of a test case known to cause false test alarms when run on an executing code build;
   identifying that the characteristics of the system and integration test failures match the characteristics of the test case known to cause false test alarms when run on an executing code build; and
   based on the act of identifying that the characteristics of the system and integration test failures match the characteristics of the test case known to cause false test alarms when run on an executing code build, providing information to a developer indicating that the system and integration test failure is potentially a false test alarm.

10. The method of claim 9, wherein the compared characteristics are identified failing test steps in a test case such that comparing comprises attempting match failed test steps of a test case for the system and integration test failure to failed test steps of a test case for a historical previous known false test alarm.

11. The method of claim 9, wherein providing information comprises providing a statistical analysis.

12. The method of claim 9, wherein providing information comprises providing information based on a confidence and a support value.

13. The method of claim 9, further comprising providing a ranking of test failures based on the comparisons to the false test alarms.

14. The method of claim 13, wherein the ranking is based on the statistical significance of the comparison.

15. The method of claim 9, wherein providing information is only performed when a statistical threshold is met.

16. The method of claim 9, further comprising receiving input regarding additional false test alarms, and as a result adding new false test alarms to the set of historical previous known false test alarms to allow new rules to be learned for evaluating subsequent system and integration test failures.

17. A system for identifying potential false test alarms to a developer for a code base under test the system comprising:
   one or more processors; and
   one or more computer-readable storage media, wherein the one or more computer-readable storage media comprise computer-executable instructions that can be executed by at least one of the one or more processors to cause the following to be performed:
      executing a code build in a test system that includes computing functionality and computing infrastructure that is able to execute the build wherein executing the code build in the test system comprises running a test case, including a plurality of system and integration tests, including a plurality of test steps, on the code build;
      as a result of executing the code build and running the test case, identifying one or more system and integration test failures, including identifying failures of one or more test steps from the test case;
      identifying one or more characteristics of the system and integration test failures;
      comparing the characteristics of the system and integration test failures to characteristics of a test case known to cause false test alarms when run on an executing code build;
      identifying that the characteristics of the system and integration test failures match the characteristics of the test case known to cause false test alarms when run on an executing code build; and
      based on the act of identifying that the characteristics of the system and integration test failures match the characteristics of the test case known to cause false test alarms when run on an executing code build, providing information to a developer indicating that the system and integration test failure is potentially a false test alarm.

18. The system of claim 17, wherein the compared characteristics are identified failing test steps in a test case such that comparing comprises attempting match failed test steps of a test case for the system and integration test failure to failed test steps of a test case for a historical previous known false test alarm.

19. The system of claim 17, wherein providing information comprises providing a statistical analysis.

20. The system of claim 17, wherein providing information comprises providing information based on a confidence and a support value.

* * * * *